United States Patent [19]

Braun et al.

[11] 3,801,956

[45] Apr. 2, 1974

[54] DIGITAL SEQUENCE DETECTOR USING MULTIPLE SAMPLES DURING EACH DIGIT TIME PERIOD

[75] Inventors: William V. Braun, Chicago; Eugene J. Bruckert, Arlington Heights, both of Ill.

[73] Assignee: Motorola, Inc., Franklin Park, Ill.

[22] Filed: Mar. 12, 1973

[21] Appl. No.: 340,153

Related U.S. Application Data

[63] Continuation of Ser. No. 134,932, April 19, 1971, abandoned.

[52] U.S. Cl. .............................................. 340/146.2
[51] Int. Cl. .............................................. G06f 7/02
[58] Field of Search .................. 235/177; 340/146.2

[56] References Cited

UNITED STATES PATENTS

| | | | |
|---|---|---|---|
| 3,439,335 | 4/1969 | Slayton | 340/146.2 |
| 3,504,341 | 3/1970 | Snyder | 340/146.2 |
| 3,598,979 | 8/1971 | Moreau | 340/146.2 X |
| 3,622,987 | 11/1971 | Borkan | 340/146.2 |

*Primary Examiner*—Malcolm A. Morrison
*Assistant Examiner*—R. Stephen Dildine, Jr.
*Attorney, Agent, or Firm*—Vincent J. Rauner; Marshall N. Dickler

[57] ABSTRACT

An asynchronous detector for detecting a binary word within a train of signals, wherein the train of signals and the binary word each contain bits, and each bit has a predetermined period. The detector includes a clock which develops a number of clock pulses within the time inverval of a bit period. The train of signals is coupled to the input of a shift register which is responsive to each clock pulse to shift the contents of each stage in the shift register, and enter a binary signal, corresponding to the signal in the train of signals coupled to the input, into the first stage. A memory circuit stores a binary word corresponding to the binary word to be recognized. A comparison circuit compares the binary signals in the shift register and the binary word in the memory circuit between clock pulses. If a predetermined number of correlations occur between the memory circuit contents and the shift register contents, the comparison circuit will develop a detection signal.

30 Claims, 4 Drawing Figures

INVENTORS:
WILLIAM BRAUN
EUGENE BRUCKERT
BY: Marshall M. Dickler
ATTORNEY.

DIGITAL SEQUENCE DETECTOR USING MULTIPLE SAMPLES DURING EACH DIGIT TIME PERIOD

This is a continuation, of application Ser. No. 134,932, filed Apr. 19, 1971 and now abandoned.

BACKGROUND

Digital systems used to detect digital information, and in particular a binary word consisting of binary digits in a train of signals, usually incorporate a two step process. The first step consists of recognizing the binary digits, commonly referred to by the contraction bits, and determining which of the two binary levels the bit may represent. The second step consists of accumulating all of the bits and comparing them to the desired binary word. A two stage detector and decoder, as it must first recognize each bit in the desired binary word, has a potentially high false alarm rate and low sensitivity. That is, it is quite possible that the decoder-detector combination will operate in response to a binary word other than the desired binary word, or that it will not operate in the presence of a correct binary word. Extraneous system noise is a common cause of such improper operation.

As the bits in the binary word have a predetermined time period, the system timing must be very closely correlated. That is, the transmitter and receiver in the system must be in synchronization in order to properly detect the bits. Furthermore, in order to recognize and detect the entire desired binary word, the word must be synchronized or framed. Framing usually requires the transmission of framing signals at the beginning and/or end of the desired binary word.

In certain types of communications systems, as for example, mobile, portable or paging communications systems, where the binary word may be used to selectively call a receiver, long delays in transmitting or receiving messages cannot be tolerated. In such systems, the time required to insert framing signals at the start and/or end of a desired binary word, and to synchronize the transmitter and receiver, will cause long delays in transmitting or receiving messages and is therefore intolerable.

SUMMARY

It is an object of this invention to provide an asynchronous digital detector which does not require time for system synchronization prior to detection.

Another object of this invention is to provide an improved digital detector requiring no preamble or frame synchronization to detect the desired binary word.

A further object of this invention is to provide a digital detector having a low false alarm rate and high sensitivity.

A still further object of this invention is to provide a digital detector having a one step detection process.

In practicing this invention, an asynchronous detector is provided for detecting a binary word within a train of signals. The train of signals, and the binary word each contain bits and each bit has a predetermined period. The detector includes a clock which develops a number of first clock pulses within the time interval of a bit period. The train of signals is coupled to a first shift register which is responsive to each first clock pulse to shift the contents of each stage in the shift register, and enter a binary signal into the first stage corresponding to the signal in the train of signals coupled to the input. A second shift register is provided for storing a binary word which corresponds to the binary word to be recognized. A comparison circuit is coupled to the first and second shift registers and operates in response to second clock pulses, generated between each of the first clock pulses, to compare the contents of the first and second shift registers. If a predetermined number of correlations occur between the signals in the first and second shift registers, the comparison circuit provides a detection signal indicating that the correct word has been recognized. In the preferred embodiment a correlation of approximately 80 percent is required. Taking multiple samples in the time interval of a bit period eliminates the need for system synchronization, reduces the false alarm rate, and increases the system sensitivity.

In order to prevent detection of an improper word the desired binary words are selected such that each is different from any other word and all cyclical variations thereof by a predetermined amount. This allows operation without requiring binary word framing.

THE DRAWING

DETAILED DESCRIPTION OF THE DRAWING

Figure 1:
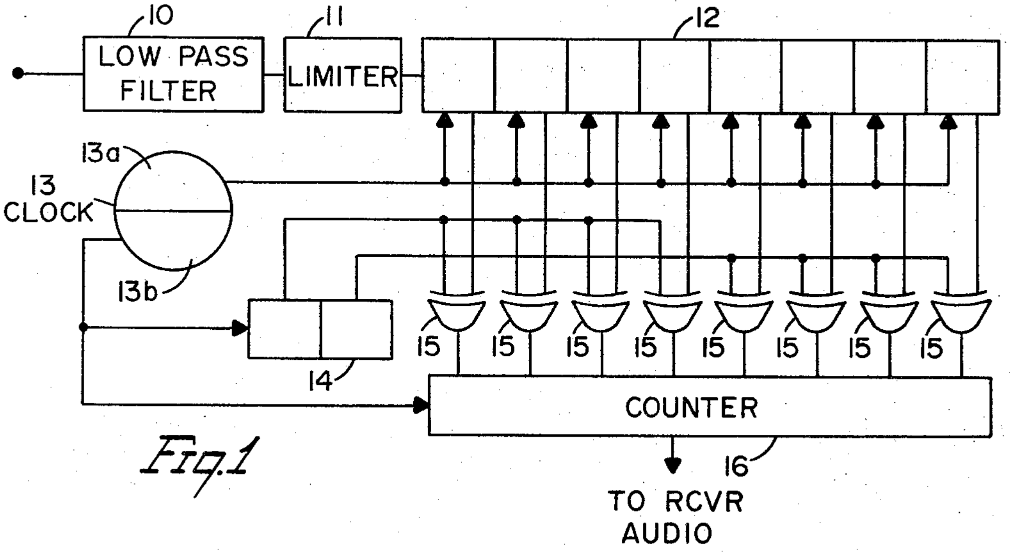
FIG. 1 is a block diagram of an asynchronous detector embodyng the features of this invention.
Figure 2:
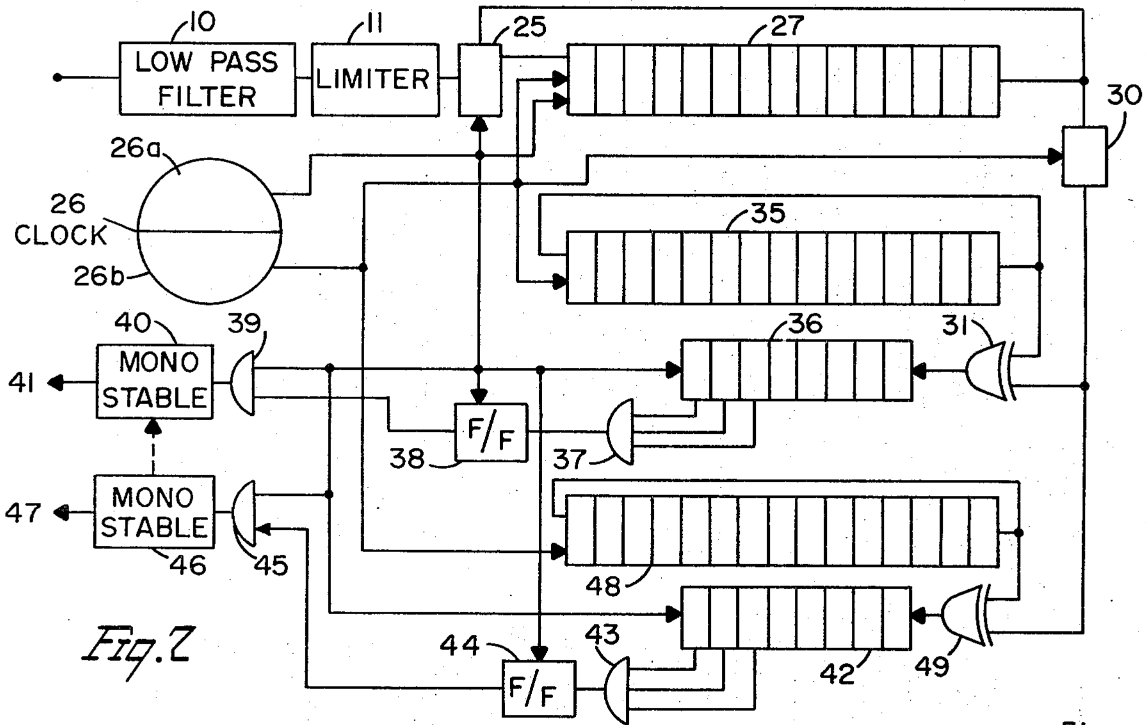
FIG. 2 is a block diagram of a second embodiment of the asynchronous detector of this invention.
Figure 3:
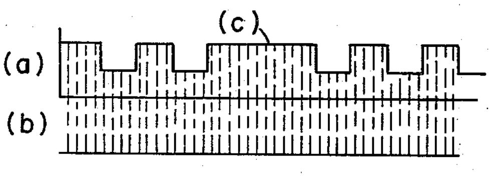
FIG. 3 is a drawing of a binary signal train and the first clock pulses developed by the clock in the detector.

The detectors shown in FIGS. 1 and 2 are binary detectors adapted to detect a binary word in a signal train. A binary word consists of a predetermined order of binary digits or bits, wherein each bit has a predetermined period. The detectors are capable of detecting the desired binary word without the need for synchronizing the receiver to the bit period timing. Referring to FIG. 3 (*a*), there is shown a binary signal train such as is capable of being detected by the detectors shown in FIGS. 1 and 2. The transitions from one level to a second level are shown to indicate the length or duration of a bit period, and the distinction between a binary zero and a binary one. Each transition is shown to indicate the end of one bit period and the beginning of the next bit period. One of the two levels represents a binary zero, and the other level represents a binary one. Three bit periods occur at (*c*) without any transitions, in order to show that a transition is not a requirement for the beginning and ending of a bit period. Although FIG. 3 (*a*), shows a sequence of binary ones and zeroes, or bits, which can be considered to constitute a binary signal train, it is not meant to represent a particular binary word which can be recobnized by the detectors of FIGS. 1 and 2. A predetermined order or sequence of bits such as are shown in FIG. 3 (*a*), can however constitute a binary word.

Referring to FIG. 1, signals, as for example, signals developed by a discriminator in a receiver, and including the desired binary word, are coupled to low pass filter 10. Low pass filter 10 attenuates all signals above a particular frequency in order to eliminate undesirable high frequency noise signals which can interfere with detection of the desired binary word. The filter cut-off frequency is selected to be approximately one half the sampling rate. The sampling rate is further explained in a subsequent portion of the application. In the preferred embodiment, low pass filter 10 has a cut-off frequency of 200 Hz. The signals passing through low pass filter 10 are coupled to limiter 11, which amplifies and limits signals which have other than a zero amplitude. The signals appearing at the output of limiter 11 are then binary signals. That is, they are at either zero or the limiting level. The signals coupled from limiter 11 can then be considered to be a train of binary signals such as is shown in FIG. 3 (*a* ).

In the preferred embodiment, the binary word which is recognized by the detectors shown in FIGS. 1 and 2 contains 23 bits. It is possible to provide 178 different binary words, using a 23 bit binary word, where each of the 178 binary words and each cyclic variation of any one will be different from any other of the 178 binary words of its cyclic variations by at least seven binary bits. This group of binary words may be what is commonly referred to as a subset of a cyclic code. Each word would then be considered an element within the subset group. Because of the great difference between each word and any of its cyclic variations, framing signals at the beginning or end of a word are not necessary. Such a word also allows the detector to provide a detection signal in response to less than a 100 percent correlation between the received word and the desired word.

The binary signal train, such as shown in FIG. 3 (*a*) is coupled from limiter 11 in FIG. 1 to shift register 12, which is a multi-stage shift register. Clock circuit 13 has a portion 13*a* which is coupled to shift register 12 and generates a number of first clock pulses within the interval of a bit period such as is shown in FIG. 3 (*b*). The first clock pulses are coupled to shift register 12 causing it to shift the binary signals in each stage to the following stage, and allowing it to sample the binary signal coupled to the first stage from limiter 11. The sampled binary signal, corresponding to the binary signal in the binary signal train coupled to the first stage, is entered into the first stage in response to the first clock pulses. In the preferred embodiment clock circuit portion 13*a* generates four first clock pulses within the interval of a bit period. As there are four first clock pulses in the interval of a bit period, each bit in the binary signal train coupled to shift register 12 can be sampled four times. If there are one hundred bits per second coupled to shift register 12, portion 13*a* must develop 400 pulses per second, and the sample rate is 400 samples per second.

Shift register 12 must have four times as many stages as there are bits in the desired word in order to enter all the sampled signals contained in the word. Shift register 12 will then contain 92 stages if a 23 bit word is used. When the 93rd binary signal is entered, the first binary signal sample taken is shifted out of the last stage of shift register 12 and lost.

Storage register 14 is provided in the system of FIG. 1, and is a multi-stage storage register containing the bits in the word it is desired to detect. The number of stages in register 14 must therefore be equal to the number of bits in the desired word. The binary signals stored in each stage of shift register 12 are coupled to one input of a series of exclusive NOR gates, hereinafter, termed EX NOR gates, identified by number 15 in FIG. 1. The number of EX NOR gates 15 corresponds with the number of stages in shift register 12. Each stage of storage register 14 is coupled to a second input of four of the EX NOR gates 15. Storage register 14 is coupled to one input of four of the EX NOR gates 15 because the binary signals coupled to those four EX NOR gates from shift register 12 should correspond to the four binary signals of a bit in the desired binary word.

Clock circuit 13 also has a portion 13*b* which produces second clock pulses between each of the first clock pulses. The second clock pulses are coupled to storage register 14. Each second clock pulse coupled to storage register 14 will cause the bits in each stage of storage register 14 to be coupled to their respective inputs of EX NOR gates 15. If the two inputs to EX NOR gates 15, one from a stage of shift register 12, and another from a stage of storage register 14 correspond, that particular EX NOR gate 15 will develop an EX NOR gate signal. It is to be understood that any logic circuit which develops an output signal in response to a correspondence between the signals at all inputs can be used in place of EX NOR gates 15. The two circuits most commonly used to perform this function are however an exclusive OR, and an exclusive NOR circuit. The EX NOR gate signal developed by each EX NOR gate 15 will be coupled to counter 16. The second clock pulse from clock circuit portion 13*b* is also coupled to counter circuit 16, causing it to count the number of EX NOR gate signals coupled from EX NOR gates 15. If the number of EX NOR gate signals coupled to counter 16 exceed a predetermined percentage of the total number of possible EX NOR gate signals which can be coupled to counter 16, the counter 16 will develop a detection signal indicating that the desired binary word has been received. In the preferred embodiment approximately 80 percent of the EX NOR gate signals must be coupled to counter 16. The detection signal may for example be used to actuate a receiver audio circuitry. Although storage register 14 is shown in FIG. 1 to consist of two stages, and shift register 12 is shown to consist of eight stages, in the preferred embodiment as previously stated, shift register 12 consists of 92 stages and storage register 14 consists of 23 stages. Although not necessary, it is possible to provide storage register 14 with 92 stages, or four stages for each bit of the desired word, and couple each stage to a second input of an EX NOR gate 15.

As previously stated, the desired binary words may constitute a subset of a cyclic code. Another characteristic of the desired word is that there is an upper limit to the maximum number of level changes, or transitions from one binary level to another which can occur in a particular word. In the case of the 23 bit word, which is used, a maximum of 16 transitions can occur. If there are four samples taken within the interval of a bit period, exact synchronization of the transmitter and receiver timing is not necessary. This is because the probability of an error due to a sample being taken during a wrong bit period interval, or at a transition between two bits, because of lack of exact synchronization, is small as compared to the number of errors necessary to indicate receipt of an incorrect word. For example, if a sample is taken at the beginning or end of a bit period interval, which can be considered to be a worst case situation, if only 16 transitions occur, a maximum of all 16 can produce incorrect samples.

Although probability theory would say that only 50 percent of the transition samples would be incorrect, for example purposes we will consider the worst case situation. Sixteen transition erros out of ninety-two samples is an error rate of 17.4 percent. As a correlation failure will only occur with a 20 percent or greater error, a 2.6 percent error due to problems such as system noise can occur before the correct word will not be recognized. The average transition error rate, if 50 percent of the transition samples are incorrect, is however 8.7 percent, leaving an error rate of 11.3 percent for such problems as system noise. Although the 2.6 percent margin is not sufficient for problems such as system noise, the 11.3 percent margin is sufficient.

If a single sample were taken during each bit interval, the worst case situation would show a possibility of 16 transition errors out of 23 samples. This is an error of 69.6 percent. If the average transition error rate were considered instead of worst case, this would be 34.8 percent. This is in excess of the maximum correlation error that would be allowable in such a system.

Although the average error rate for three samples per bit period interval would indicate that three samples per bit, in a 23 bit word, will be sufficient to eliminate the need for exact synchronization between the transmission and receiver; it has been found that four samples in a bit period interval will provide a low enough average transition error rate so that other system errors, when added to the synchronization error, will not prevent recognition of a correct or desired word. Furthermore, taking four samples per bit period interval reduces the false alarm rate of the system to a desired level. False alarm rate is defined as the rate of response to false or erroneous words by the system.

Referring to FIG. 2 there is shown a second embodiment of the asynchronous digital detector of this invention. A signal train is coupled to low pass filter 10, which is identical to low pass filter 10 in FIG. 1. From low pass filter 10 the signal train is coupled to limiter 11, again identical to limiter 11 in FIG. 1. From limiter 11, the binary signal train such as is shown in FIG. 3 (*a*), is serially coupled to gate 25. Clock circuit 26 has a first portion 26*a* which is coupled to gate 25 and produces four timing or first clock pulses within the interval of a bit period in the same manner as the first portion 13*a* of clock circuit 13 shown in FIG. 1. Again, the clock pulses are represented in FIG. 3 (*b*).

Each clock pulse when coupled to gate 25 allows the binary signal in the binary signal train to be coupled through gate 25 to shift register 27. Shift register 27 is a multi-stage shift register identical to shift register 12 in FIG. 1. In the preferred embodiment, the desired or predetermined, binary word contains 23 binary bits and shift register 27 will contain 92 stages. The first clock pulse from first portion 26*a* of clock circuit 26 is coupled to shift register 27, causing it to shift the binary signals in each stage to the following stage, and allowing it to sample the binary signal coupled to the first stage from gate circuit 25. The sampled binary signal, corresponding to the binary signal in the signal train coupled to the first stage of shift register 27, is entered into the first stage in response to the first clock pulse. Assuming all 23 binary bits in the predetermined binary word have been entered into shift register 27, each group of four stages in shift register 27 will contain four binary signals corresponding to a binary bit in the predetermined binary word.

Clock circuit 26 also has a portion 26*b* which generates a series of second clock pulses between each of the first clock pulses. In the preferred embodiment, 92 second clock pulses are generated between each of the first clock pulses. These second clock pulses are coupled to shift register 27 causing the binary signals therein to be shifted therethrough from the last stage through gate 25 to the first stage until the entire word has been shifted in a circular fashion once through shift register 27. As each binary signal appears in the last stage of shift register 27, it is coupled through gate 30, also energized by each second timing pulse, to one input of exclusive NOR, (EX NOR) circuit 31. A second shift register 35 is provided which may have ninety-two stages. Shift register 35 contains binary signals which correspond to the correct sequence of binary signals in the predetermined binary word. Each group of four stages in shift register 35 contains four binary signals corresponding to a bit in the predetermineed or desired binary word.

The second clock pulses from portion 26*b* of clock circuit 26 are also coupled to shift register 35, causing the binary signals in shift register 35 to shift in a circular fashion from output to input in a complete cycle, just as occurs in shift register 27. As a binary signal appears in the last stage of shift register 35 it is coupled to a second input of EX NOR circuit 31. If the two inputs to EX NOR circuit 31, one from shift register 35 and the other from shift register 27 correspond, EX NOR circuit 31 will generate an EX NOR circuit signal which is coupled to counter 36. Counter 36 counts the number of correlations between the signals in shift registers 35 and 27, and develops a counting signal for each count. The counting signals for each count are coupled from counter 36 to AND gate 37. If a predetermined number of counts occur, each input of AND gate 37 will have a counting signal coupled thereto, causing it to develop an AND gate signal. In the preferred embodiment, if approximately 80 percent of the binary signals in shift registers 35 and 27 correspond, the counting signals from counter 36 will cause AND gate 37 to develop an AND gate signal. This AND gate signal is coupled to flip-flop 38 which changes state in response to the AND gate signal and develops a flip-flop output signal. The flip-flop output signal is coupled to one input of AND gate 39. A second input to AND gate 39 couples a first clock pulse from first portion 26a of clock circuit 26 such that when the first clock pulse occurs, and the input to AND gate 39 from flip-flop 38 is also present, AND gate 39 will develop an AND gate signal. The first clock pulse coupled to AND gate 39 is also coupled to counter 36 and flip-flop 38 resetting them in preparation for the next count.

The AND gate signal from AND gate 39 is coupled to a retriggerable timer 40 which can be a retriggerable monostable multivibrator. Monostable multivibrator 40 will change states and be maintained in a second state for a predetermined period of time. In its second state, monostable multivibrator 40 will develop a detection signal at terminal 41. The detection process in this case indicates that a correct word has been received. At the end of the predetermined period of time it will return to its first state, ending the detection signal. The time duration during which monostable multivibrator 40 remains in a second state is slightly greater than that transmitted to again receive a subsequently trasmitted 23 bit binary word. If the following 23 bit binary word again corresponds to the predetermined binary word, monostable multivibrator 40 will again be energized to maintain the detection signal at output terminal 41.

The timing of monostable multivibrator 40 can be selected such that it will remain in the second state for a time slightly greater than that necessary to receive two or three subsequently received 23 bit binary words. By maintaining monostable multivibrator 40 in its second state for this period of time, the detection signal can be maintained even though a fade in the RF signal occurs which prevents recognition of the next word. This is commonly referred to as "fade protection".

FIG. 2 includes another, or second, shift register 48, which may be physically similar to shift register 35, and may be used to store another word to be detected. Portion 26*b* of clock circuit 26 is coupled to shift register 48, and operates in response to the second clock pulses in the same manner as shift register 35. EX NOR circuit 49 responds to a correspondence of signals coupled thereto from shift register 48 and gate 30, in the same manner as EX NOR circuit 31, to generate an EX NOR circuit signal which is coupled to counter 42. Counter 42 counts the number of EX NOR signals, or correlations, and develops counting signals which are coupled to AND gate 43. When the desired number of correlations occur, (80 percent), AND gate 43 will develop an AND gate signal which causes flip-flop 44 to charge states and couple a flip-flop signal to AND gate 45. AND gate 45 operates in the same manner as AND gate 39 and will develop an AND gate signal at the next second clock pulse from clock 26. This AND gate signal will trigger monostable 46 to develop a detection signal at terminal 47.

In the preferred embodiment, second shift register 48 can be twelve stages long and will contain either all binary zeros or all binary ones. The detector will respond to the receipt of either all binary zeros, or all binary ones, whichever is stored in register 48, to provide a positive turnoff feature by resetting monostable 46. This allows the transmitted message to be terminated at a particular time, rather than allowing the detection signal developed by monostable 46 from being maintained for the duration of the time interval. When this circuit is used to allow the passage of audio signals in a receiver, a positive turnoff feature is especially desirable.

As can be seen, a number of shift registers, such as 35 and 48, may be provided to detect a number of different words, or, to provide intraword detection of the same word. That is, the same word, shifted in position by a few bits from the original word, can be entered into a second or third register. Detection of this shifted form of the desired word will occur between the first and second receipt of the desired word. This will provide a greater number of detections in a given period of time, allowing a decrease in the timed period of monostable 40 and 46.

Although FIG. 2 shows the operation of the detector with EX NOR gate 31, it can be replaced by an EX OR gate. An EX OR gate will develop an output signal in response to a lack of correspondence between the signals coupled from the last stages of shift registers 35 and 27. Counter 36 will then develop counting signals in response to a lack of correlation between the binary signals in shift registers 35 and 27. AND gate 37 will now develop an AND gate signal if the number of counting signals indicate a lack of correlation of greater than 20 percent between the binary signals in shift registers 35 and 27. In this case, the detection signal supplied at terminal 41 will indicate receipt and recognition of an incorrect, rather than a correct, word.

A further modification of the circuitry shown in FIG. 2 can be effected by providing shift register 35 with a number of stages corresponding to the number of bits in the predetermined binary word. In the preferred embodiment this would be 23 stages. A divide by four circuit is coupled between shift register 35 and portion 26*b* of clock circuit 26 such that the second clock pulses coupled to shift register 35 would be divided by four. That is, every fourth, second clock pulse developed by portion 26*b* of clock circuit 26 would cause a clock pulse to be coupled to shift register 35. Shift register 35 would therefore shift only once for every four shifts of shift register 27. Each binary bit stored in shift register 35 would then be compared four times against four sample binary signals in shift register 27.

Figure 4:
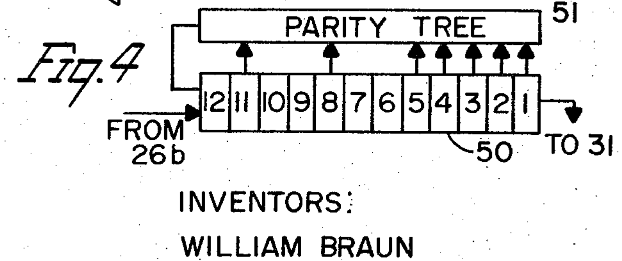
FIG. 4 is a block diagram of another embodiment of the storage circuitry shown in FIG. 2.

Another characteristic of the desired 23 bit word, and any cyclic variation thereof, is that the last eleven bits of the word are determined by what the first twelve bits are, and by their sequence. That is, if the first twelve bits are defined, the subsequent eleven bits may be derived. Referring to FIG. 4, there is shown a shift register which operates in accordance with this principal, and which may be used in place of registers 35 or 48. The register consists of a 12 stage register 50, and a parity tree 51, coupled to particular stages of register 50, and used to generate the last 11 bits. Pulses from second portion 26*b* of clock 26 are coupled to register 50 in the same manner as they would be coupled to register 35, causing the bits to shift one stage and generating the next bit. The bit in the last stage may be coupled to EX NOR circuit 31 in the same manner as shown in FIG. 2.

By taking multiple samples the sensitivity of the detector circuit is increased while the false alarm rate is decreased. This is because errors in the receipt of a binary bit, such as errors created by noise pulses, or due to a decrease in signal strength inhibiting correct receipt of a bit, will only cause a decrease in the number of correlations as opposed to the recognition of an improper bit. Although a decrease in the number of correlations between the predetermined or desired word, and the sampled signals can inhibit recognition of a word, this will usually occur where the signal is so poor that any subsequently received message would not be clearly understood.

As can be seen, an asynchronous digital detector has been provided. The asynchronous digital detector requires no time to synchronize the transmitted and received binary signals prior to the detection, nor does it require a preamble or frame synchronization for the desired binary word. By taking multiple samples during each bit period and requiring less than 100 percent correlation, close synchronization between the bit period timing and detector timing is no longer necessary. Furthermore the multiple samples decrease the probability of receiving a false or erroneous message and increase the sensitivity of the detector. By taking multiple samples of the received signal and correlating the samples with the desired predetermined word, the two step process of first recognizing binary bits and then correlating the recognized binary bits with the desired binary bits in a desired word is reduced to a one step process. Use of a word which is an element in a subset of a cyclic code allows utilization of the above described features of the detector.

I claim:

1. An asynchronous detector for detecting a particular binary word within a train of signals wherein the train of signals includes bits, each bit having a predetermined period, said detector including in combination; clock means for developing a plurality of first clock pulses during the interval of a bit period, sample and storage means having an input for serially receiving said train of signals and a plurality of stages for storing binary signals, said sample and storage means being coupled to said clock means and responsive to said first clock pulses to sample the signal in said train of signals coupled to said input and store a binary signal corresponding to said sampled signal, memory means for storing a binary word corresponding to said particular binary word, and comparison means coupled to said sample and storage means and said memory means and operative to compare said binary signals in said sample and storage means with the binary word in said memory means and develop a comparison signal in response to a plurality of correlations between said binary signals and said binary word.

2. The detector of claim 1 wherein said sample and storage means is a first shift register having a plurality of stages, each containing a binary signal corresponding to a sampled signal.

3. The detector of claim 2 wherein said memory means is a storage register having a plurality of stages each containing a bit in said binary word.

4. The detector of claim 3 wherein said comparison means includes a plurality of gate circuit means each being coupled to one stage of said shift register means and to one stage of said plurality of storage register means, said gate circuit means each being operative in response to a correlation between said binary signal in the first shift register coupled thereto and the binary bit in the storage register coupled thereto to develop a gate circuit signal, and counter means coupled to said plurality of gate circuit means for counting said gate circuit signals and operative in response to a predetermined number of said gate circuit signals to develop a detection signal.

5. The detector of claim 4 wherein said clock means further develops second clock pulses between the first clock pulses, and wherein said counter means is further coupled to said clock means and responsive to said second clock pulses to count said gate circuit signals and develop said detection signal.

6. The detector of claim 5 wherein said clock means first clock pulses include four clock pulses during the interval of a bit period.

7. The detector of claim 6 wherein said binary word includes a predetermined number of binary bits, and said first shift register has a number of stages equal to four times the predetermined number of binary bits in said binary word.

8. The detector of claim 2 wherein said memory means includes a second shift register having a plurality of stages for storing said binary word therein.

9. The detector of claim 8 wherein said clock means further develops a plurality of second clock pulses between said first clock pulse, said first and second shift registers being responsive to said second clock pulses to shift said bits in said word and said binary signals therethrough.

10. The detector of claim 9 wherein said comparison means includes gating circuit means coupled to said last stage of said first and second shift registers, said gating means operative in response to a correlation between the binary signal coupled from the first shift register and the binary bit coupled from the second shift register to develop a first gate signal, counter means coupled to said gating means and operative to develop counting signals in response to said first rate signals, and circuit means coupled to said counter means and responsive to a plurality of said counting signals to develop a detection signal.

11. The detector of claim 10 wherein said circuit means is responsive to said counting signals indicative of a correlation of greater than 80 percent of said bits in said binary word and said binary signals to develop said detection signal.

12. The detector of claim 11 wherein said clock means develops four first clock pulses during each bit period, said first shift register means having a number of stages equal to four times the number of binary bits in said binary word, said first shift register being operative in response to each of said second clock pulses to shift said binary signals therethrough, said second shift register being operative in response to every fourth one of said second clock pulses to shift said binary bits therethrough, whereby each binary bit in said second shift register and four of said binary signals in said first shift register are compared.

13. An asynchronous detector for detecting predetermined binary words within a train of signals and wherein the train of signals includes bits, each bit having a predetermined period, said detector including in combination; clock means for developing a plurality of first clock pulses during the interval of a bit period, first shift register means having an input for serially receiving said train of signals and a plurality of stages for storing binary signals therein, said first shift register means being coupled to said clock means and responsive to each first clock pulse to shift the contents of each stage of said shift register means and enter a signal corresponding to the signal in the train of signals coupled to the input, memory means for storing said predetermined binary words therein, and comparision means coupled to said shift register means and said memory means and operative to compare said signals stored in said shift register means and said predetermined words in said memory means and develop a comparison signal in response to a plurality of correlations between said signals in said shift register means and one of said predetermined words in said memory means.

14. The asynchronous detector of claim 13 wherein said comparison means compares the contents of said shift register means and the words developed by said memory means between each of said first clock pulses.

15. The asynchronous detector of claim 14 wherein said predetermined binary words includes a plurality of bits, said first shift register having a number of stages equal to four times said predetermined number of bits in each of said binary words.

16. The detector of claim 15 wherein said memory means includes a plurality of shift registers each having a plurality of stages for storing a binary word therein said clock means further developing a plurality of second clock pulses between said first clock pulses, said first shift register and said memory means shift registers being responsive to said second clock pulses to shift said binary bits in said binary word and said binary signals therethrough.

17. The detector of claim 16 wherein said comparison means includes a plurality of gating circuit means each coupled to said first shift register and to one of said memory means shift registers, said gating means operative in response to a correlation between the binary signal coupled from the first shift register and the binary bit coupled from the memory means shift register coupled thereto to develop a first gate signal, counter means coupled to said gating means and operative to develop counting signals in response to said first gate signals, and circuit means coupled to said counter means and responsive to a plurality of said counter signals to develop a detection signal.

18. The detector of claim 17 wherein said first shift register is responsive to each of said second clock signals to shift said binary signals one stage therethrough, and wherein said memory means shift registers are responsive to every fourth one of said second clock signals to shift said binary bits one stage therethrough.

19. The detector of claim 18 wherein said circuit means is responsive to said counting signals indicative of a correlation of greater than 80 percent of said bits in said binary word and said binary signals to develop said detection signal, and wherein said counter means is further coupled to said clock means and operative in response to said first pulses to reset said counter.

20. The detector of claim 17 wherein said circuit means includes retriggerable timer means operative in response to said plurality of counter signals to develop said detection signal and maintain said signal for a predetermined period of time.

21. An asynchronous detector for detecting a particular digital word within a train of signals wherein each digit in said word has a predetermined equal time period, said detector including in combination; clock means for developing a plurality of first clock pulses during the interval of a digit time period, circuit means for receiving said train of signals, said circuit means being coupled to said clock means and responsive to each of said first clock pulses to sample the signal in said train of signals coupled thereto and store a digital signal corresponding to said sample signal, memory means for storing a digital word corresponding to said particular digital word, and comparison means coupled to said circuit means and said memory means and operative to compare said digital signals in said circuit means with the digital word in said memory means and develop a comparison signal in response to a correlation therebetween.

22. The detector of claim 21 wherein said circuit means is a first shift register having a plurality of stages each containing a digital signal corresponding to a sampled signal.

23. The detector of claim 22 wherein said memory means includes a storage register having a plurality of stages each containing a digit in said digital word.

24. The detector of claim 22 wherein said memory means includes a second shift register having a plurality of stages for storing said digital word therein.

25. The method of detecting particular binary words within a received train of signals wherein said words each include a predetermined number of bits, each bit having a predetermined time period, said method including the steps of:

a. continuously sampling said received train of signals, a plurality of said samplings being taken within said time period of a bit,
b. developing a binary signal corresponding to the sampled signal in said train of signals in response to each sampling,
c. comparing a predetermined number of said binary signals to stored binary words corresponding to said particular binary words, and
d. developing a detection signal in response to a predetermined number of correlations between said compared binary signal and one of said stored binary words.

26. The method of claim 25 wherein said predetermined number of binary signals compared to said stored binary words is equal to the predetermined number of bits in each of said words multiplied by the plurality of said samplings being taken within said time period of a bit.

27. The method of claim 26 wherein said plurality of said samplings being taken within the time period of said bit is four.

28. The method of claim 27 wherein said comparing of said binary signals to said stored binary words occurs between each of said samplings.

29. The method of claim 28 wherein four of said binary signals are compared to one bit in each of said stored binary words.

30. The method of claim 29 wherein said train of signals is serially received and wherein said binary signals are stored in series.

* * * * *